(12) United States Patent
Boudreau et al.

(10) Patent No.: US 6,444,154 B1
(45) Date of Patent: Sep. 3, 2002

(54) CONTINUOUS PREPARATION OF A LIQUID SILICONE RUBBER COMPOSITION

(75) Inventors: Bruce Boudreau; Teresa Grocela-Rocha, both of Waterford; Edward M. Jeram, Burnt Hills; August O. Liermann, Schenectady; Gerardo Rocha-Galicia, Waterford; David A. Williams, Ganesvoort, all of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/742,911

(22) Filed: Dec. 20, 2000

(51) Int. Cl.⁷ .............................................. B29C 47/88
(52) U.S. Cl. ............................... 264/211.23; 264/210.6; 264/211; 524/588
(58) Field of Search ..................... 524/588; 264/211.23, 264/210.6, 211

(56) References Cited

U.S. PATENT DOCUMENTS

| | | | |
|---|---|---|---|
| 3,824,208 A | | 7/1974 | Link et al. |
| 4,649,005 A | | 3/1987 | Kobayashi et al. |
| 5,082,886 A | | 1/1992 | Jeram et al. |
| 5,122,562 A | | 6/1992 | Jeram et al. |
| 5,198,171 A | * | 3/1993 | Kasahara et al. |
| 5,409,978 A | | 4/1995 | Hamada et al. |
| 5,506,303 A | * | 4/1996 | Yoshida et al. |
| 5,531,923 A | | 7/1996 | LeBlanc et al. |
| 5,559,183 A | | 9/1996 | Razzano |
| 5,573,189 A | | 11/1996 | Ward et al. |
| 5,929,143 A | | 7/1999 | Ward et al. |
| 6,211,267 B1 | * | 4/2001 | Suto et al. |

FOREIGN PATENT DOCUMENTS

| | | |
|---|---|---|
| EP | 258159 | 3/1988 |
| EP | 568891 | 11/1993 |
| EP | 1110691 | 6/2001 |

\* cited by examiner

*Primary Examiner*—Robert Dawson
*Assistant Examiner*—Marc S. Zimmer
(74) *Attorney, Agent, or Firm*—Philip D. Freedman; Kenneth S. Wheelock

(57) ABSTRACT

A continuous process provides a devolatilized liquid injection moldable silicone composition. In the process, a filler, treating agent and silicone polymer are introduced into an extruder having a length to diameter ratio of at least greater than 50. The filler, treating agent and silicone elastomer are continuously compounded in the extruder into a devolatilized liquid injection moldable silicone composition. A system for preparing a liquid silicone rubber composition comprises a mixer to prepare a concentrate of filler and silicone polymer, a long extruder having an L/D ratio of greater than 50, connected to the mixer to receive the concentrate from the mixer and to compound and devolatilize the concentrate, a treating agent and silicone polymer into a liquid silicone rubber composition containing volatiles and a cooler to receive the liquid silicone rubber composition to cool, homogenize and further devolatilized the composition.

24 Claims, 3 Drawing Sheets

FIG.3

Extruder Type: Werner & Pfleiderer 53mm
Process Conditions

| Example | Fumed Silica Feed (lb/hr) | Output Rate (lb/hr) | HMDZ (parts) | Water (parts) | Vinyl Silazane (parts) | Pressure bbl 6 (psi) | Melt Temp. Discharge (°C) | Extruder Temperature Settings (°C) | | | | | | Screw Speed (rpm) |
|---|---|---|---|---|---|---|---|---|---|---|---|---|---|---|
| | | | | | | | | Barrels 1-2 | Barrels 3-5 | Barrels 6-15 | Barrels 18-19 | Barrels 20 | Barrels 21-22 | |
| 1 | 25 | 98 | 3.0 | 1.0 | 0.50 | 140 | 207 | <50 | 50 | 200 | 200 | 200 | 200 | 600 |
| 2 | 25 | 97 | 3.0 | 1.0 | 0.72 | 120 | 210 | <50 | 50 | 200 | 200 | 200 | 200 | 600 |

FIG.4

Testing Results

| Example | Sp.Grav. (Sheet) | Shore A Hardness | Tensile (psi) | Elongation (%) | Tear (ppi) | Modules 100% (psi) | 250F Rheometer | | | | 350F Rheometer | | | |
|---|---|---|---|---|---|---|---|---|---|---|---|---|---|---|
| | | | | | | | T2 (secs) | T90 (secs) | Max Torq (lb-in) | P.Rate (lb-in/min) | T2 (secs) | T90 (secs) | Max Torq (lb-in) | P.Rate (lb-in/min) |
| 1 | 1.114 | 39.7 | 1317 | 634 | 229 | 171 | 17 | 34 | 11.6 | 59 | 4 | 11 | 11.6 | 115 |
| 2 | 1.126 | 43.0 | 1129 | 447 | 180 | 199 | 22 | 36 | 15.7 | 101 | 3 | 10 | 15.8 | 149 |

# CONTINUOUS PREPARATION OF A LIQUID SILICONE RUBBER COMPOSITION

BACKGROUND OF THE INVENTION

The invention relates to a process of preparing a liquid silicon rubber (LSR) composition.

An LSR composition also referred to as a LIM composition, is a multi-component combination of a vinyl-containing polydiorgansiloxane fluid, a hydrogen-containing polydiorganosiloxane fluid, an effective amount of a platinum catalyst and a reinforcing filler, such as a fumed silica and additional additives. Typically, two component mixtures are mixed and charged into a preheated mold where they are rapidly cured to produce a rubber part. A first component mixture includes a vinyl-containing polydiorgansilozane fluid, a silica filler and an effective amount of a platinum catalyst and a second component mixture includes a hydrogen containing polydiorganosiloxane fluid in combination with other ingredients, including a vinyl containing polyorganosiloxane fluid and a silica filler.

Typically, the LSR composition is produced by kneading a polydiorganosiloxane, inorganic filler and additives by means of a kneading machine such as a Banbury mixer, a turbulizer, a change can mixer or a low intensity double arm dough mixer. In this process, polydiorganosiloxane, inorganic filler, treating agents and additives are batch mixed until desired properties are obtained. The batch mixing process can take 12 to 30 hours per batch. After mixing, the LSR composition is stripped of volatiles and cooled. This final step requires additional time to complete preparation of the LSR composition.

A batch process requires long residence times and large amounts of energy. Non-homogeneous shear and extensional stresses across a commercial sized batch can result in non-uniform size distribution of filler that results in variations in properties. Different physical properties may result form batch to batch. Batches processed at different times may be characterized by different physical properties. The batch process is labor, energy and capital intensive and produces materials of only marginal consistency.

There is a need for a continuous process that consistently produces a devolatilized LSR composition from polymer, filler and additives.

BRIEF SUMMARY OF THE INVENTION

The invention provides a continuous process that prepares a devolatilized LSR composition. The process comprises introducing a filler, treating agent and silicone polymer into an extruder having a length to diameter ratio of at least greater than 50. The filler, treating agent and silicone polymer are continuously compounded and devolatilized in the extruder into a devolatilized LSR composition.

In an embodiment, the invention provides a system for preparing a liquid silicone rubber composition. The system comprises a mixer to prepare a densified concentrate of filler and silicone polymer, a long extruder having an L/D ratio of greater than 50, connected to the mixer to receive the densified concentrate from the mixer and to compound and devolatilize the densified concentrate, a treating agent and silicone polymer into a liquid silicone rubber composition containing volatiles and a cooler to receive the liquid silicone rubber composition to cool, homogenize and further devolatilized the composition.

BRIEF DESCRIPTION OF THE DRAWINGS

FIG. 3 is a table of processing conditions; and

FIG. 4 is a table of testing results including product properties.

DETAILED DESCRIPTION OF THE INVENTION

The invention reduces filler treatment reaction time and provides an economical system for producing silicone compositions including LSR compositions. Two parts of an LSR composition can be made simultaneously. Inventories can be reduced and equipment clean-out required between runs of a batch process can be eliminated.

In one step of the process, filler surface treatment is effected by mixing and reacting filler, polydimethylsiloxane polymer and treating agents. The mixture can then be stripped of volatiles and cooled. According to the invention, filler treatment is reduced from hours to a few minutes, e.g., 2–6. The is continuously in-situ treated to produce a base, which can be filtered and then catalyzed.

In one embodiment, the process comprises four steps; 1) filler densification, 2) In-situ treatment, volatiles stripping and filtering, 3) cooling, homogenization and de-airing and 4) catalization. Prior to densification, the filler can be pre-mixed with silicone polymer to facilitate feeding into a reactor. A co-rotating twin screw extruder can be used as the reactor to mix the densified filler with treating agents (HMDZ, water, vinyl silazane) and additional polymer.

The subsequent reaction is effected at higher temperatures and pressures than in a batch process. The in-situ treatment can require a minimum residence time in the extruder, a temperature in the range of 160–210° C. and pressure between about 70 and about 300 psi.

Stripping of volatiles can be effected toward the end of the extruder while the material is hot thereby eliminating secondary operations. Residual amounts of nitrogen containing by-products measured as parts per million HMDZ can be at about the 100 ppm level. Filtration can be done at the discharge of the extruder while the material is hot, eliminating secondary operations. Cooling and de-airing can be effected in a separate counter-rotating mixer, which can provide back-mixing and a high residence time to homogenize the material into a base.

Finally, the base can be divided in two components and separately mixed in static mixers with catalyst and other additives to produce two separate "A" and "B" components. The two components can be made simultaneously to reduce inventories.

These and other features will become apparent from the drawings and following detailed discussion, which by way of example without limitation describe preferred embodiments of the present invention.

Figure 1:
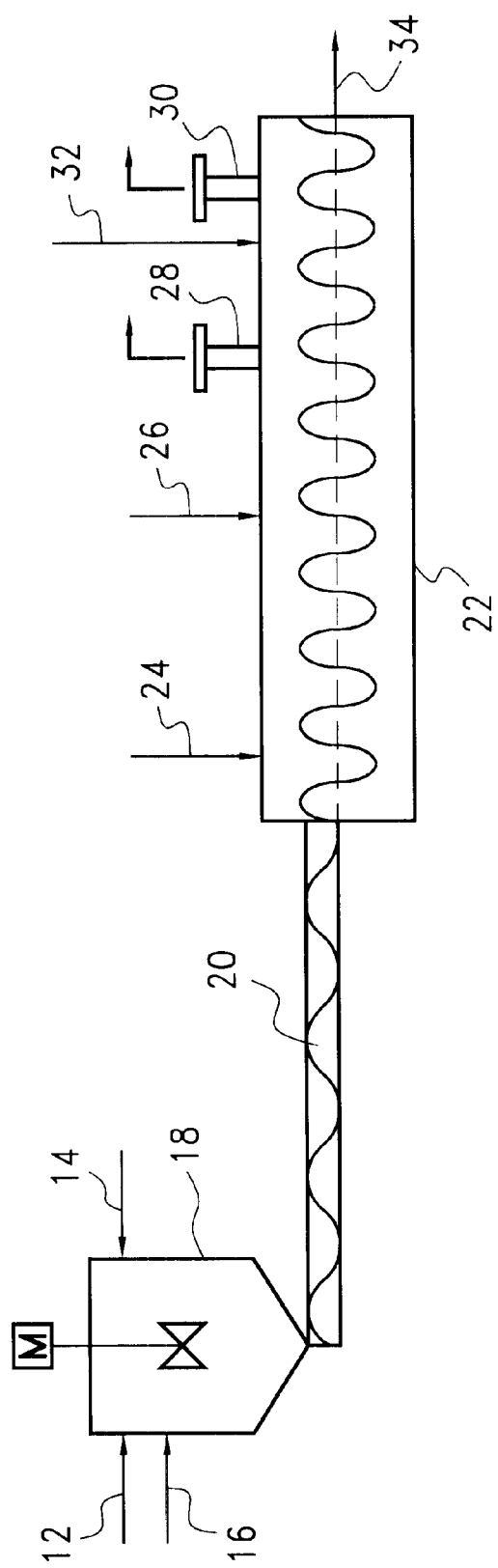
FIG. 1 is a schematic representation of a continuous LSR composition process.

In FIG. 1, a filler such as fumed silica is continuously in situ treated and compounded with a silicone polymer such as a vinyl-terminated polydimethylsiloxane. In a first step, fumed silica 12, an initial amount of silicone polymer 14 and a treating agent 16 are charged into a continuous mixer 18 such as a Bepex Turbolizer to form a densified polymer/filler mass.

The filler that can be used in this invention is any inorganic filler with silanol surface groups that can be compounded with silicone polymers.

Examples of inorganic fillers include a reinforcing silica such as fumed silica or precipitated silica. A single filler or a combination of fillers can be used to reinforce the silicone polymer.

The silicone polymer used in the compositions of the present invention is typically a vinyl-terminated polydimethylsiloxane having a viscosity varying from 100 to 2,000,000 cps at 25° C. The polymer can be represented by recurring units of Formula I:

FORMULA I

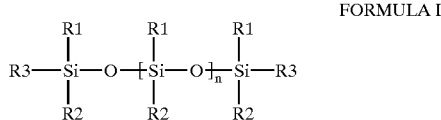

wherein, $R^1$ independently at each occurrence represents $C_{1-4}$ alkyl, or $C_{2-4}$ alkylene; $R^2$ independently at each occurrence represents $C_{1-4}$ alkyl, $C_1$–$C_4$ haloalkyl or $C_{2-4}$ alkylene; $R^3$ independently at each occurrence represents H, $C_{1-10}$ alkyl, $C_{2-4}$ alkylene, $C_{4-6}$ cycloalkyl, OH or $C_1$–$C_4$ haloalkyl; and n represents an integer so that the viscosity of the silicone polymer varies from 100 to 2,000,000 cps at 25° C. Broadly, n can be about 80 to about 3500, desirably, n is a value of about 100 to less than 1000.

A further preferred composition comprises a silicone polymer wherein, $R^1$ independently at each occurrence represents, $CH_3$ or $CH=CH_2$; $R^2$ independently at each occurrence represents, $CH_3$, $CH=CH_2$ or $CH_2CH_2CF_3$; $R^3$ independently at each occurrence represents $CH_3$, $CH=CH_2$, OH or $CH_2CH_2CF_3$; and n represents an integer from about 200 to about 900.

Another embodiment provides a composition wherein the vinyl content of the silicone polymer ranges from about 0.05% to about 0.5% by weight of the silicone polymer.

The amount of filler in the densification step can be from about 20 to about 150 parts by weight, desirably from about 30 to about 100 parts by weight and preferably from about 40 to about 70 parts by weight, per 100 parts by weight of the high viscosity silicone polymer. During the compounding step, addition of further silicone polymer reduces the proportion of silica in the final silicone composition to about 10 to about 100 parts by weight, desirably from about 15 to about 90 parts by weight and preferably from about 25 to about 70 parts by weight, per 100 parts by weight of the total high viscosity silicone polymer.

The treating agent is a silanol or methoxy stopped silicone polymer that reacts with the filler surface hydroxyl or silanol groups to prevent a condensation reaction among filler particles or between filler and gum molecules that otherwise leads to stiffening and loss of elastomeric properties. The treating agent reduces filler silanol groups and reduces the time required for aging of the silicone, to prevent crepe hardening and/or to regulate plasticity. The treating agent can be an organosilane, an organosilazane, a low-viscosity polyorganosiloxance or a silicone resin, which has a silanol group and/or an alkoxy group having 1 to 6 carbon atoms. Examples include diphenylsilanediol, dimethylsilanediol, methyltriethoxysilane and phenyltrimethoxysilane. The low-viscosity polysiloxane may contain one or more kinds of organic groups selected from a methyl group, a phenyl group, a vinyl group and a 3,3,3-trifluoropropyl group. Preferred silanol-reactant treating agents include silanol-stopped polydimethylsiloxane, octamethylcyclotetrasiloxane (D4) and hexamethyldisilazane (HMDZ). The viscosity of the polysiloxane measured at 25° C. is in the range of from about 1 to about 300 cP, preferably from about 5 to about 100 cP.

The treating agent can be added in the compounding step in a weight proportion of about 0.1 to about 100 parts fluid to 100 parts of filler, desirably about 0.5 to about 75 parts fluid to 100 parts of filler and preferably about 1.0 to about 50 parts fluid to 100 parts of filler. The treating agent can react to reduce available groups of the filler to a concentration of between about 8 to about 2 hydroxyl groups/(nanometer)$^2$ of filler, preferably between about 7 to about 3 hydroxyl groups/(nanometer)$^2$ of filler. In an embodiment, the treating agent can be a combination of HMDZ and water. This combination can comprise a weight ratio of HMDZ/water of between about 0.1 to 10, desirably between 0.2 to 5 and preferably between 0.3 to 3.

In the extruder 22, a densified filler and polymer concentrate 20 and additional silicone polymer 24, treating agent and water are fed at barrels 1 to 2, further additional fluid 26 is added downstream at about barrel 16 and volatiles are stripped in two vacuum vents 28, 30 at barrels 18 to 19 and at 21 to 22. Water 32 is injected between vent sections to facilitate stripping. According to the invention, the L/D ratio of the entire extruder is at least greater than 50 to achieve proper filler treatment and stripping of volatiles. Desirably, the L/D ratio is greater than 60 and preferably greater than 70. The exemplary extruder 22 of FIG. 1 has an L/D ratio of 78.

During the extruder step, addition of further silicone polymer reduces the proportion of silica in the final silicone composition to about 5 to about 100 parts by weight, desirably from about 10 to about 40 parts by weight and preferably from about 15 to about 30 parts by weight, per 100 parts by weight of the total high viscosity silicone polymer.

Reaction between silanol groups on the filler and the treating agent takes place under pressure and at elevated temperature in the extruder compounding step. The screws of the treatment section ($3^{rd}$ barrel to $18^{th}$ barrel), can be configured to provided a pressure of about 16 and about 400 psi. Desirably, the pressure is about 40 to about 300 psi and preferably about 100 and about 200 psi. Temperature in a feed section of the extruder (L/D<9) is maintained at less than about 150° C., preferably less than about 120° C. Temperature is controlled in the treatment section (L/D=9 to discharge) between about 100 and 250° C., desirably between 120 and 240° C. and preferably between 130 and about 230° C.

Compounding in extruder 22 produces a base silicone composition 32 that can be used to produce LSR silicone composition components.

Figure 2:
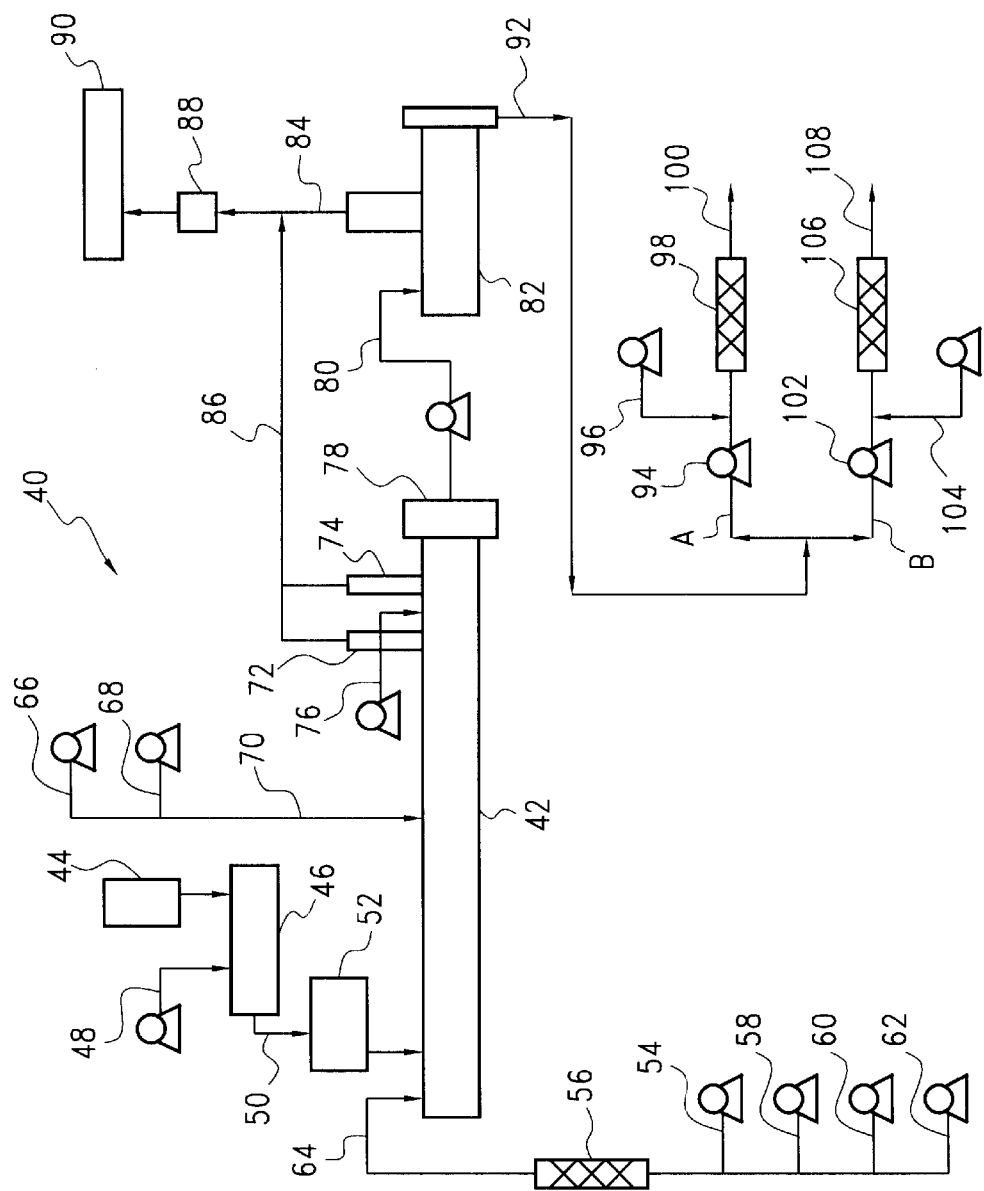
FIG. 2 is a schematic representation of an overall process for preparing an LSR composition.

FIG. 2 illustrates an overall process and system for preparing an LSR composition. In FIG. 2, the system 40 includes long extruder 42 having an L/D ratio of at least greater than 50. In the process, filler is fed from feeder 44 to densifier 46, e.g., a Bepex turbolizer or a Drais mixer. where it is mixed with initial silicone polymer 48 to form a concentrate of a filler and polymer concentrate 50. The densified filler and polymer concentrate 50 is crammed by means of screw feed 52, e.g., a Werner and Pfleiderer ESBV crammer feeder, into the long extruder 42

Additional silicone polymer 54 is combined in mixer 56 with additives such as HMDZ treating agent 58, water 60 and silazane 62 and is then charged 64 into the long extruder 42 for compounding with densified filler and polymer concentrate 50. Further additional silicone polymer 66 can be mixed with vinyl polymer 68 and charged 70 to the long extruder 42 downstream from the charge of concentrate 50.

The compounded and reacted components are devolatilized at vents 72 and 74 with water 76 charged between the vents. Devolitilization is important for at least two reasons. First, devolitilization removes unreacted treating agents to "quench" further reaction with filler silanol groups.

Otherwise, further reaction can diminish filler reinforcement properties in the heat-vulcanizable silicone composition. Second, devolitilization removes surplus liquids that adversely affect Theological properties of the silicone composition.

The compounded, reacted and devolatilized LSR composition is filtered 78 and pumped 80 to a cooler 82. The LSR composition is cooled and back mixed in cooler 82 to de-air and to further homogenize the composition. The cooler 82 can be under vacuum to produce further devolatilization. Cooler 82 can be a counter-rotating twin screw mixer such as a LIST ORP. The volatiles 84 from the cooler are combined with volatiles 86 from the extruder 42 and are exhausted by vacuum 88 to volatiles recovery 90.

Cooled LSR composition 92 is divided into two streams, A and B. Stream A is pumped 94 with platinum catalyst and other additives A 96 to static mixer 98 to produce component mixture A 100 and stream B is pumped 102 with hydrides and other additives B 104 to produce component mixture B 106. Component mixture A 100 and component mixture B 106 can be charged to a mold (not shown) where they can be rapidly cured to produce a rubber part.

These and other features will become apparent from the following detailed discussion, which by way of example without limitation describes preferred embodiments of the present invention.

EXAMPLES

Filler was mixed with vinyl-terminated polydimethylsiloxane (viscosity about 40,000 cps at 25° C., n about 800) in a Bepex Turbolizer to provide a densified filler concentrate. The densified concentrate was fed into a 53 mm, Krupp Werner & Pfleiderer co-rotating twin screw extruder with a 78 L/D ratio. In the extruder, the filler was mixed with HMDZ, water, vinyl silazane and additional vinyl-terminated polydimethylsiloxane at barrels 1 and 2. Downstream (barrel 6), the filler was mixed with more vinyl-terminated polydimethylsiloxane and the mixture was compounded under elevated temperature in a section of the extruder that was sealed to maintain pressure. FIG. 3 shows conditions for two runs of the extruding step.

Hot compounded base material was discharged from the extruder to a LIST ORP jacketed mixer for cooling. The base was subjected to back mixing in the mixer to even-out inconsistencies to provide a homogenous product. The mixer was under a vacuum, which served to further strip and de-air the base.

The base is divided into two parts (A and B), which are fed via metering pumps into static mixers. Platinum catalyst and other additives are introduced into part A base just prior to feed to the mixer. Hydrides and other additives are introduced into part B base before mixing.

Properties of two final formulations each containing catalyst and hydride are shown in FIG. 4. The two rows of results shown in FIG. 4 correspond to the two runs of FIG. 3.

These Examples show that a devolatilized LSR composition with excellent properties can be continuously produced from polymer, filler and additives according to the invention.

While preferred embodiments of the invention have been described, the present invention is capable of variation and modification and therefore should not be limited to the precise details of the Examples. The invention includes changes and alterations that fall within the purview of the following claims.

What is claimed is:
1. A process of preparing a liquid silicone rubber composition, comprising:
   introducing a filler, treating agent and silicone polymer into an extruder having a length to diameter ratio of at least greater than 50; and
   continuously compounding and devolatilizing said filler, treating agent and silicone polymer into said liquid silicone rubber composition in said extruder;
   wherein said silicone polymer comprises a vinyl-terminated polydimethylsiloxane represented by recurring units of the following Formula:

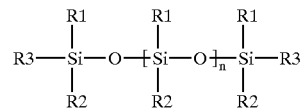

wherein, $R^1$ independently at each occurrence represents $C_{1-4}$ alkyl, or $C_{2-4}$ alkylene; $R^2$ independently at each occurrence represents $C_{1-4}$ alkyl, $C_1$–$C_4$ haloalkyl or $C_{2-4}$ alkylene; $R^3$ independently at each occurrence represents H, $C_{1-10}$ alkyl, $C_{2-4}$ alkylene, $C_{4-6}$ cycloalkyl, OH or $C_1$–$C_4$ haloalkyl; and n is a value of about 100 to less than 1000.

2. The process of claim 1, wherein said extruder is a co-rotating, intermeshing double screw extruder.

3. The process of claim 1, comprising densifying filler with an initial amount of silicone polymer prior to introduction of said filler into said extruder.

4. The process of claim 1, further comprising discharging said liquid rubber composition from said extruder to a cooler.

5. The process of claim 4, wherein said cooler comprises a counter rotating double screw extruder.

6. The process of claim 4, wherein said liquid silicone rubber composition is cooled, homogenized and further devolatilized in said cooler.

7. The process of claim 6, wherein said liquid silicone rubber is in residence in said cooler for a period greater than residence in said extruder.

8. The process of claim 1, further comprising dividing said liquid silicone rubber composition into a first stream and a second stream.

9. The process of claim 8, wherein a platinum catalyst is added to said first stream to produce a component mixture A and a crosslinker is added to said second stream to produce a component mixture B.

10. The process of claim 9, wherein said component mixture A and said component mixture B are injected into a mold where they are cured to produce a rubber part.

11. The process of claim 1, wherein said filler is a raw, untreated silica.

12. The process of claim 1, wherein said filler is a pretreated filler with treating agent.

13. The process of claim 12, wherein said treating agent is a silanol-reacting treating agent.

14. The process of claim 1, wherein said filler contains silanol groups and said treating agent comprises silanol-stopped polydimethylsiloxane, octamethylcyclotetrasiloxane (D4) or hexamethyldisilazane (HMDZ).

15. The process of claim 14, further comprising maintaining an elevated pressure in a section of said extruder while compounding said filler, treating agent and silicone fluid to enhance reaction.

16. The process of claim 15, comprising maintaining a pressure between about 16 and about 400 psi.

17. The process of claim 15, comprising maintaining a pressure between about 40 to about 300 psi.

18. The process of claim 15, comprising maintaining a pressure between about 100 and about 200 psi.

19. The process of claim 1, comprising controlling temperature in said extruder in a feed section (L/D<9) to less than 150° C. and then from said feed section to discharge between about 120 and about 240° C.

20. The process of claim 1, comprising controlling temperature in said extruder in a feed section (L/D<9) to less than 120° C. and then from said feed section to discharge between about 130 and about 230° C.

21. The process of claim 1, wherein said length to diameter ratio is at least greater than 60.

22. The process of claim 1, wherein said length to diameter ratio is at least greater than 70.

23. The process of claim 1, wherein $R^1$ independently at each occurrence represents, $CH_3$ or $CH=CH_2$; $R^2$ independently at each occurrence represents, $CH_3$, $CH=CH_2$ or $CH_2CH_2CF_3$; and $R^3$ independently at each occurrence represents $CH_3$, $CH=CH_2$, OH or $CH_2CH_2CF_3$.

24. The process of claim 23, wherein $R^1$ independently at each occurrence represents, $CH_3$ or $CH=CH_2$; $R^2$ independently at each occurrence represents, $CH_3$, $CH=CH_2$ or $CH_2CH_2CF_3$; $R^3$ independently at each occurrence represents $CH_3$, $CH=CH_2$, OH or $CH_2CH_2CF_3$; and n represents an integer from about 4,000 to about 10,000.

* * * * *